UNITED STATES PATENT OFFICE.

PHILIP C. HOFFMANN, OF RICHMOND, VIRGINIA, ASSIGNOR TO VIRGINIA-CAROLINA CHEMICAL COMPANY, OF RICHMOND, VIRGINIA, A CORPORATION OF NEW JERSEY.

FERTILIZER AND PROCESS FOR MAKING THE SAME.

1,360,401.           Specification of Letters Patent.           Patented Nov. 30, 1920.

No Drawing.       Application filed June 19, 1920.   Serial No. 390,224.

*To all whom it may concern:*

Be it known that I, PHILIP C. HOFFMANN, a citizen of the United States, residing at Richmond, in the county of Henrico and State of Virginia, have invented certain new and useful Improvements in Fertilizers and Processes for Making the Same, of which the following is a specification.

My invention has for its object to provide a new fertilizer in which the ammonia and phosphate content shall be present in a suitable ratio for general use, and a process for making fertilizers from cyanamids and phosphoric acid by which the full value of each of these ingredients as fertilizers may be made available in the product as plant foods.

According to my invention commercial powdered calcium cyanamid, which usually contains about 20 per cent. of free lime, is treated with liquid phosphoric acid in such proportions that in the ensuing reaction the free lime is converted into monocalcium phosphate and the calcium cyanamid itself is also converted into monocalcium phosphate and monoammonium phosphate, as indicated by the following chemical equations:

I. 
$$CaCN_2 + CaO + 2H_3PO_4 = CaCN_2 + CaH_4(PO_4)_2H_2O$$

II. 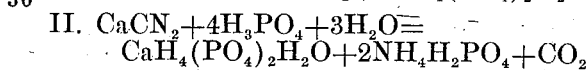
$$CaCN_2 + 4H_3PO_4 + 3H_2O = CaH_4(PO_4)_2H_2O + 2NH_4H_2PO_4 + CO_2$$

III. 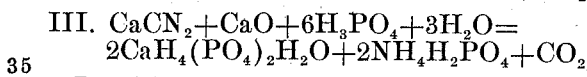
$$CaCN_2 + CaO + 6H_3PO_4 + 3H_2O = 2CaH_4(PO_4)_2H_2O + 2NH_4H_2PO_4 + CO_2$$

It will be observed that the product of these reactions, after the escape of the carbondioxid gas, consists of a mixture of monocalcium phosphate and monoammonium phosphate, both of which are soluble and highly valuable fertilizer ingredients. In practice I have found that by this process approximately all of the phosphoric acid and cyanamid used are made available in the product for use as a plant food. Waste by-products are by this method almost entirely eliminated and the cost of manufacture is therefore greatly reduced. Moreover, the product upon analysis is found to yield about 10% of ammonia and 28% of phosphoric acid, and thus combines these essential fertilizer ingredients in a particularly efficient ratio.

It is obvious from the foregoing that many variations may be made in details of the process and product without departing from the spirit and scope of my invention.

In the following claims the word concentrated is used to mean sufficiently concentrated to produce the reactions herein set forth. But extremely concentrated acid is not necessary for this purpose. The word concentrated is used to distinguish the foregoing reactions from the reactions which are described in my copending application, Serial No. 402,668, which may be brought about by the use of relatively dilute acid.

What I claim is:

1. As a fertilizer the reaction product of calcium cyanamid with concentrated phosphoric acid.

2. The process of preparing a fertilizer by treating calcium cyanamid with concentrated phosphoric acid.

3. The process of treating calcium cyanamid with concentrated phosphoric acid in such proportions as to convert it into monocalcium phosphate and monoammonium phosphate.

PHILIP C. HOFFMANN.